No. 724,166. PATENTED MAR. 31, 1903.
J. O. DECKERT.
BINDER FRAME.
APPLICATION FILED JUNE 24, 1902.
NO MODEL. 3 SHEETS—SHEET 3.
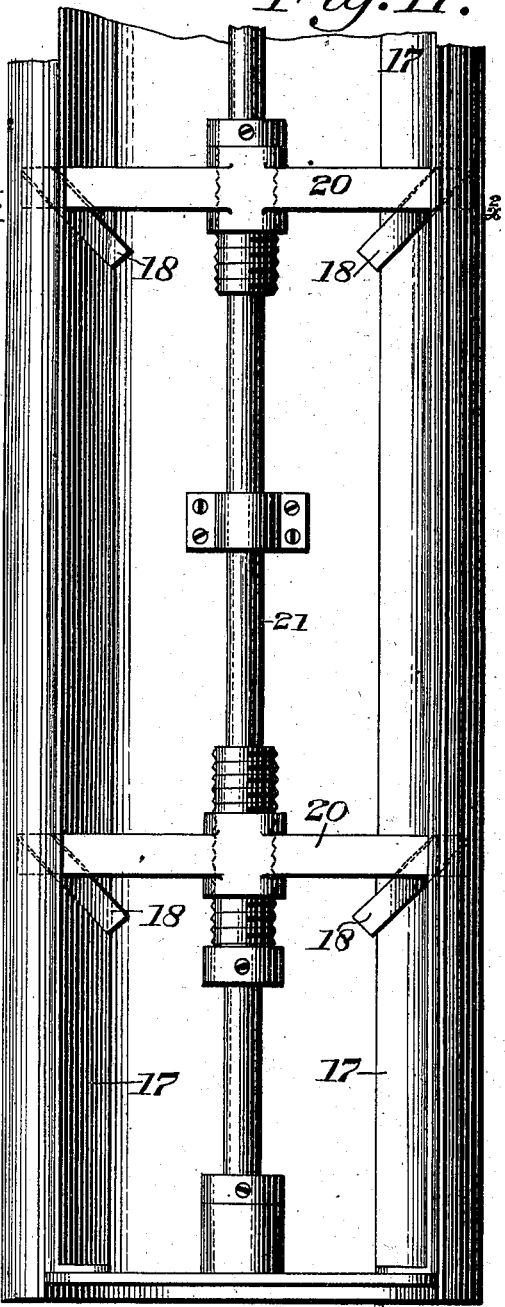
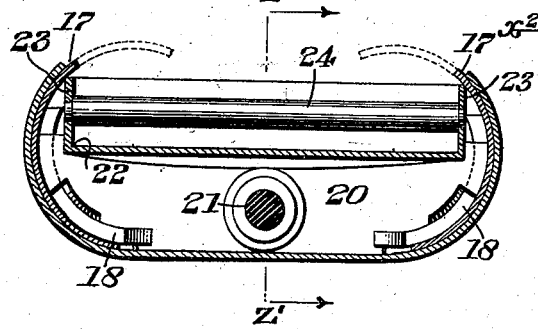
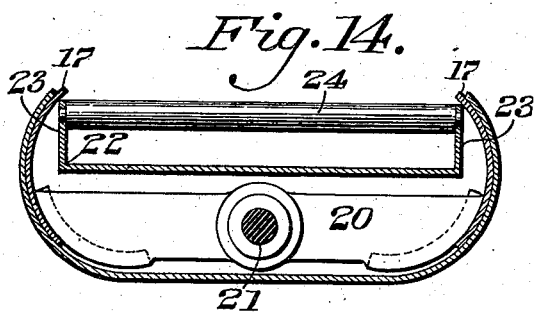
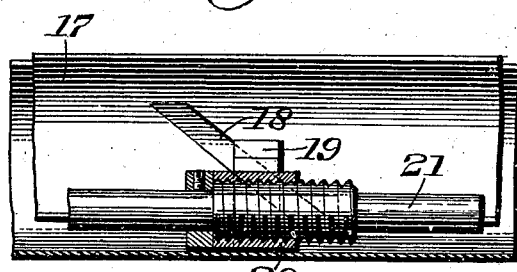
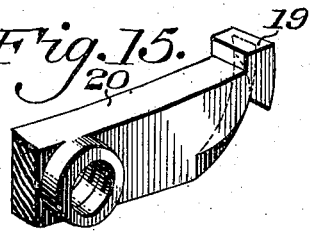
Witnesses
Inventor
Joseph O. Deckert
By Wiederscheim & Fairbanks
Attorneys

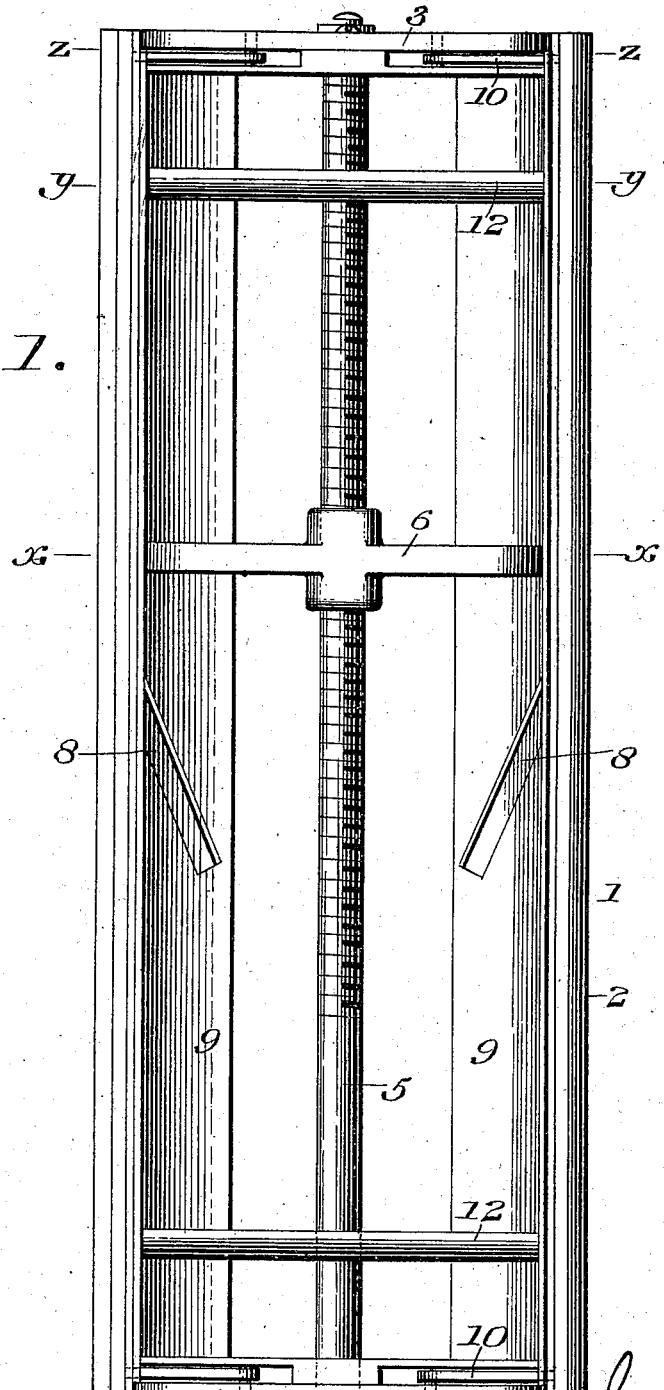

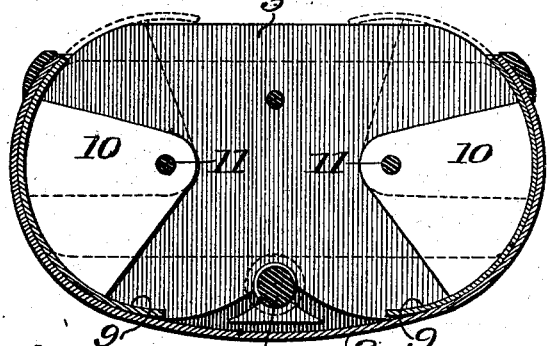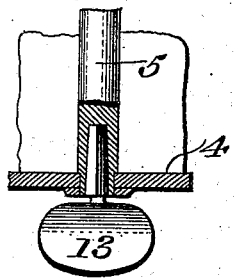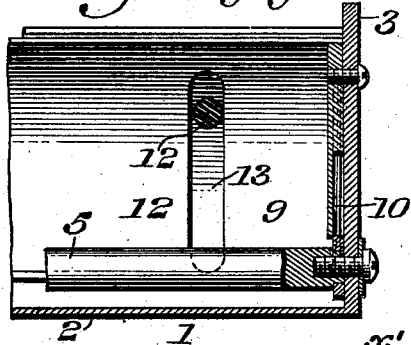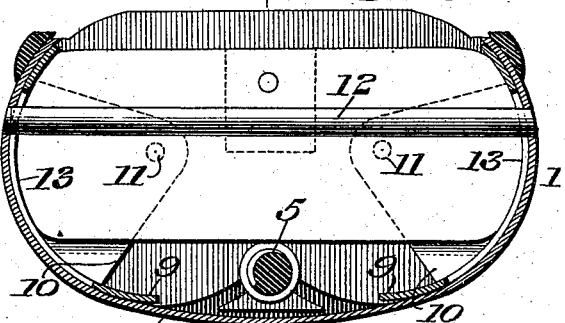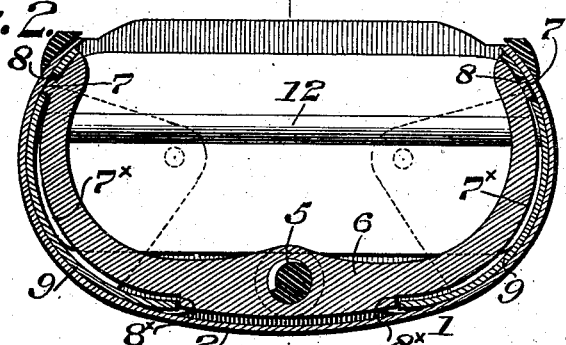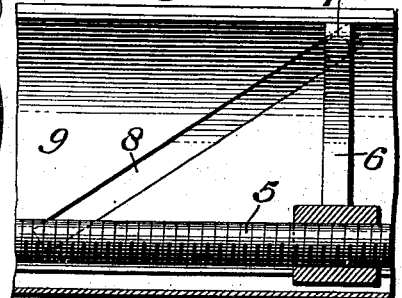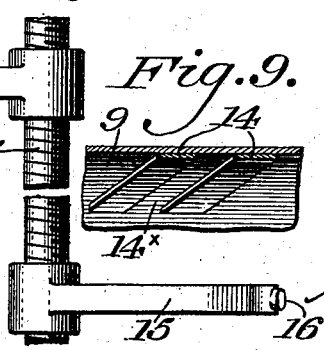

UNITED STATES PATENT OFFICE.

JOSEPH O. DECKERT, OF PHILADELPHIA, PENNSYLVANIA, ASSIGNOR TO WILLIAM MANN COMPANY, A CORPORATION OF PENNSYLVANIA.

BINDER-FRAME.

SPECIFICATION forming part of Letters Patent No. 724,166, dated March 31, 1903.

Application filed June 24, 1902. Serial No. 112,948. (No model.)

*To all whom it may concern:*

Be it known that I, JOSEPH O. DECKERT, a citizen of the United States, residing in the city and county of Philadelphia, State of Pennsylvania, have invented a new and useful Improvement in Binder-Frames, of which the following is a specification.

My invention relates to a novel construction of a binder-frame which is simple and durable in construction and capable of being readily adjusted to permit of conveniently and quickly binding the leaves in such a manner that they are readily and separately removable and interchangeable, provision being made for enabling the jaws which retain the leaves in position to be operated simultaneously in a positive and direct manner, whereby the number of parts are reduced to a minimum.

To the above ends my invention consists of the novel binder-frame having a threaded rod which is adapted to actuate a traveling arm or traveler, the latter being provided with means coacting with suitable jaws, which engage the leaves held therein with a uniform and direct pressure, said jaws moving in an arc-shaped plane.

It further consists of novel details of construction, all as will be hereinafter fully set forth, and particularly pointed out in the claims.

Figure 1 represents a plan view of a binder-frame embodying my invention. Fig. 2 represents a transverse section on line $x\ x$, Fig. 1. Fig. 3 represents a transverse section on line $y\ y$, Fig. 1. Fig. 4 represents a transverse section on line $z\ z$, Fig. 1. Fig. 5 represents a transverse section on line $x'\ x'$, Fig. 2. Fig. 6 represents a transverse section on line $y'\ y'$, Fig. 3. Fig. 7 represents a sectional view, partly in elevation, showing the manner in which the threaded rod is actuated. Fig. 8 represents a plan view of a traveler or traveling arm and its adjuncts slightly differing from the corresponding device seen in Fig. 1. Figs. 9 and 10 represent sectional views showing different means for forming grooves in the jaws of the binder-frame. Fig. 11 represents a plan view of a modified construction of a binder-frame. Fig. 12 represents a transverse section on line $x^2\ x^2$, Fig. 11. Fig. 13 represents a section on line $z'\ z'$, Fig. 12. Fig. 14 represents a sectional view, partly in side elevation, somewhat similar to Fig. 12. Fig. 15 represents a perspective view of a portion of a traveling arm seen in Fig. 11 in detached position.

Similar numerals of reference indicate corresponding parts in the figures.

Referring to the drawings, 1 designates a binder-frame, the same consisting of a back which supports the operative parts of the binder-frame. This back is composed of the back proper or outer portion 2, which is preferably concave in its contour, and the end pieces 3 and 4, rigid with relation to said back proper or outer portion 2. Thus the end pieces are a part of the back, and upon said back, or specifically in said end pieces in the present instance, is rotatably mounted the threaded rod 5, which carries the traveling arm or traveler 6, the latter being curved to conform substantially to the contour of the back 2 and having thereon the lugs or projections 7, which are adapted to engage the walls of the slots 8, which latter are inclined to the axis of the rod 5, as will be understood from Figs. 1 and 5, said slots being located in the curved or arc-shaped jaws 9, which are provided with the wings or end pieces 10, which are pivotally secured at the points 11 to a suitable support—namely, the back, or, specifically, the end pieces 2 and 3, forming a part of said back—said arm having the recessed portions 7$^\times$, the shoulders 8$^\times$ thereof serving as stops or abutments to limit the downward movement of said jaws.

The leaves that are used in connection with a binder-frame of this class are provided with slots by which they are held in place within the frame independently of the jaws—that is to say, when the jaws are open—and I have shown pins 12, that serve as a support for the leaves. These supports 12 extend transversely between jaws and in Fig. 3 are mounted at their ends in the back proper or outer portion 2 of the back, passing through slots 13 in the jaws 9. When the leaves are inserted, these supports 12 extend within the slots therein, so that when the jaws are open to remove or insert leaves the other leaves are held in place by means of these supports.

13 designates a suitable key which is adapted to detachably engage the rod 5, as will be understood from Fig. 7, whereby said rod can be readily rotated according to requirements.

In Fig. 8 I have shown the rod 5 as being provided with arms or travelers 15, which are made in sections instead of one piece, as shown in Fig. 1, as will be understood from said Fig. 8, and provided with the lugs 16, which are adapted to engage slots in the jaws 9 and have the same function as the lugs 7, already described.

In Fig. 9 I have shown the inclined or cam groove corresponding to the groove 8 as being formed between the pair of inclined strips, as 14, whereby a track or guideway $14^\times$ is formed.

The operation will be apparent to those skilled in the art. The leaves (not shown) are held in position by means of the contact of the outer portions or edges of the jaws 9 therewith, although it is understood that when the jaws are open—that is to say, are not clamped upon the leaves—the latter are held loosely in the frame by means of the supports 12. The said jaws are moved toward or away from the leaves by the rotation of the threaded rod 5, it being apparent from Fig. 1 that the rotation of said rod will impart a longitudinal movement to the traveler or traveling arm 6 or arms 15 (seen in Fig. 8) and that the longitudinal movement of said traveler will by reason of the coaction of the lugs or projections 7 with the contiguous cam slot or slots cause said jaws to open and close, as will be understood from Fig. 1.

It will be apparent from the foregoing that the jaws 9 will move simultaneously and in unison and that a positive and direct pressure will be given by said jaws throughout their entire length.

It will be understood by those skilled in the art that if it should be desired to remove a leaf or leaves (not shown) from the jaws the same can be readily done upon turning the threaded rod 5 in the desired direction, which can be readily effected by the application of the key 13 thereto or by other suitable means, whereby said jaws will be moved inwardly, or, in other words, from the position seen in dotted lines in Fig. 4 to the position seen in Figs. 2 and 3, whereby the tension of said leaves will be removed and the desired leaf or leaves can be readily withdrawn, although it is understood that the other leaves are held within the binder-frame when the tension of jaws is removed by the supports 12, after which by rotating the threaded rod in the opposite direction the parts will assume the position seen in dotted lines in Fig. 4 once more.

It will be seen from the foregoing that by my employment of the traveler and the interlocking coacting devices common thereto and to the jaws I am enabled to dispense with toggle-levers, telescoping pins, springs, and the like, whereby the construction is very much simplified and the cost of production reduced to a minimum.

It will be apparent that equivalent devices may be employed in place of the precise structure seen in Figs. 1 to 7, inclusive, since, for example, I may form the cam-groove $14^\times$ between the inclined strips 14, as seen in Fig. 9, instead of cutting the same directly in the jaws 9. The traveler or traveling arm 6 may be constructed in two parts, as seen in Fig. 8, which latter is an equivalent construction to that seen in Fig. 2, and other equivalent devices may also be developed by those skilled in this art which come within the scope of this invention.

In Figs. 11 to 15 I have shown another embodiment of my invention, wherein the jaws 17 are provided with the inclined ridges 18, which are engaged by suitable ways or recesses 19 on the traveling arm or arms 20, which are mounted upon threaded portions of the rod 21 and moved in unison therewith, as has already been explained, the rotation of the threaded rod 21 serving to actuate said traveling arms or travelers 20 in the desired direction, whereby the opening and closing of the jaws is effected.

In the construction seen in Figs. 12 and 14 I support upon the rods 21 or other suitable portions of the casing or back—as, for instance, at the ends—the box or trough-shaped structure 22, which extends transversely or laterally substantially across the open front side of the back and forms a cover for the mechanism within the casing formed by the back, the jaws operating or passing through the spaces between the sides of the box and the back. The pins 24, forming the supports for the leaves in this construction, are secured to the sides 23 of the box 22.

It will be apparent that the trough or pan 22 can be readily removed from the binder-frame and that the same serves to conceal the operating mechanism therein.

It is further noted that between the sides of the box or trough-shaped structure 22 and the adjacent portions of the casing forming the back are spaces through which the jaws move in opening and closing, and it will be understood, further, that it is not necessary that the member 22 be made in the form of a box or trough, since, its function being to cover and conceal the operative parts of a device and to form a back support for the leaves, it could therefore be made in the form of a plate merely and secured at its ends to the end pieces of the casing.

I desire to call special attention to the fact that since the jaws 9 and 17, as well, are each hinged or pivotally supported at their extremities in substantially the manner described their movement will be free, positive, and direct throughout their entire length.

It will, further, be apparent that since the jaws move in a curvilinear path toward or away from the leaves (not shown) held therebetween said leaves will be much more effectively held in position than would be the case if the jaws moved toward and away from said leaves in a rectilinear line.

In a contemporaneously-pending application filed by me December 5, 1901, bearing Serial No. 84,748, I have shown, described, and broadly claimed mechanism for moving the jaws of a binder-frame in a circular path, and to the above-described mechanism I herein make no claim.

It will be apparent that various changes may be made in the art which may come within the scope of my invention, and I do not therefore desire to be limited in every instance to the exact construction as herein shown and described.

Having thus described my invention, what I claim as new, and desire to secure by Letters Patent, is—

1. A binder-frame, consisting of a back or outer portion, a longitudinal rod mounted in suitable supports, a traveling arm of curved contour having upwardly-extending portions, longitudinally-immovable, curved jaws pivotally secured to the back and intermediate of said arm and back, and interlocking devices common to said portions and jaws, whereby the movement of said traveling arm causes said jaws to open and close.

2. A binder-frame, consisting of a back, end pieces secured to said back, a threaded rod rotatably mounted in said ends, a traveling arm consisting of upwardly-curved members actuated by said rod, jaws pivotally secured to the back and located intermediate of said traveling arm and back and interlocking devices common to the upper portions of said arms and to said jaws, whereby the latter are opened or closed by the rotation of said threaded rod.

3. A binder-frame, consisting of a back having a curved or concaved contour, curved jaws situated interiorly of said back, a traveler consisting of arms having upwardly-extending curved portions and situated interiorly of said jaws, interlocking diverging cam-faces common to said arms and jaws, a threaded rod mounted in suitable supports, means for supporting said jaws and means for rotating said rod whereby said jaws will move inwardly and outwardly in a curvilinear line.

4. A binder-frame, consisting of curvilinear longitudinally-immovable jaws pivotally supported, a threaded rod mounted in suitable bearings, a traveler consisting of upwardly-curved arms actuated by said rod and connections between said jaws and traveler, whereby the longitudinal movement of the latter is adapted to actuate said jaws inwardly and outwardly in a curved path, said arms having recesses in their under portions adapted to receive said jaws.

5. A binder-frame, consisting of curvilinear jaws suitably supported, a threaded rod mounted in suitable bearings, a traveler consisting of upwardly-curved arms actuated by said rod and connections between said jaws and traveler, whereby the longitudinal movement of the latter is adapted to actuate said jaws inwardly or outwardly in a curved path, said arms having recesses in their under portions adapted to receive said jaws, said recesses terminating in shoulders which act as stops to limit the movement of said jaws.

6. A binder-frame, consisting of a back, a threaded rod longitudinally supported upon said back, a traveler adapted to be moved by said rod, curved jaws pivotally secured to said back and adapted to be moved in curvilinear lines and cam-grooves and pins common to said jaws and traveler.

7. A binder-frame, consisting of a back, curved jaws pivotally secured to said back, and means suitably connected with said back and adapted to operate said jaws to turn the same upon their pivots to open or close the same in curved paths, approximately concentric to the curve of the jaws.

8. In a binder, a back, two curved clamping members pivotally secured to said back and adapted to move in curvilinear lines, a suitably-actuated longitudinally-movable member and connections between said last-named member and said first-named members including oblique guides, through the medium of which said clamping members can be moved.

9. In a binder, a back, two curved clamping members pivotally secured to said back and adapted to move in curvilinear lines, a longitudinally-movable member and connections between said last-named member and said first-named members through the medium of which said clamping members are actuated to open and close the same.

10. A binder-frame, consisting of a back, longitudinally-immovable jaws pivotally secured thereto, a threaded rod mounted in suitable bearings, a traveler actuated by said rod and mechanism intermediate said jaws and traveler whereby the movement of the latter is adapted to move said jaws inwardly or outwardly in a curved path, approximately concentric to the curve of the jaws.

11. A binder-frame, consisting of a back, jaws movably mounted on said back and adapted to move toward or away from each other, transverse supports for the leaves or sheets extending between said jaws and independent thereof the path of movement of said jaws being at an angle to the plane of said supports.

12. In a binder, a curved back, and curved jaws pivotally secured thereto and adapted to be moved toward and away from each other in curved paths, approximately concentric to the curve of the jaws.

13. In a binder, a back, longitudinally-immovable jaws pivotally secured thereto, said back being shaped to provide a casing inclosing said jaws when the latter are open.

14. In a binder, a back, a pair of longitudinally-immovable jaws pivotally secured thereto and adapted to be moved toward and away from each other in curved paths, approximately concentric to the curve of the jaws.

15. In a binder, a curved back, and longitudinally-immovable curved jaws pivotally secured thereto and adapted to be moved toward and away from each other in curved paths, approximately concentric to the curve of the jaws.

16. In a binder, a back, curved jaws which are pivotally secured at different points to said back and are adapted to be moved toward or away from each other in curved paths, approximately concentric to the curve of the jaws.

17. A binder, consisting of a back, curved jaws pivotally secured thereto at different points, and longitudinally-movable actuating means suitably supported independent of said jaws and adapted to engage therewith to move the same toward or away from each other.

18. In a binder, a casing forming the back thereof, the inner side of said casing being open, longitudinally-immovable jaws pivotally secured within said casing, and longitudinally-movable means for moving said jaws.

19. In a binder, a back having end pieces, and curved jaws movably mounted on said end pieces and adapted to move toward and away from each other, in curved paths approximately concentric to the curve of the jaws.

20. In a binder, a back having end pieces, curved jaws movably mounted on said end pieces, and an actuating device mounted on said end pieces and adapted to actuate said jaws toward and away from each other, in curved paths approximately concentric to the curve of the jaws.

21. In a binder, a back having end pieces, curved jaws movably mounted on said end pieces, a rod mounted on said end pieces, and mechanism intermediate said rods and jaws, whereby the latter are operated toward and away from each other, in curved paths approximately concentric to the curve of the jaws.

22. In a binder, a back, jaws movably mounted thereon, means for operating said jaws toward and away from each other, and a transverse support for the leaves which is extended between and is independent of said jaws.

23. In a binder, a back, jaws movably mounted thereon, means for actuating said jaws toward and away from each other, and a transverse support for the leaves mounted on said back extending between and independent of said jaws.

24. A binder, a back, and longitudinally-immovable curved jaws pivoted thereto, the lines of movement of which are in curved paths, approximately coincident with the curve of said jaws.

25. In a binder, a back, curved jaws pivoted on said back, the pivots of said jaws being at points which are approximately the center of the curve of said jaws, and means for opening and closing said jaws.

26. A binder, a curved back, curved jaws pivotally secured thereto, a curved follower, said back, jaws and follower being concentrically curved and superimposed, connections between said follower and said jaws for moving the latter, and means for moving said follower.

27. In a binder, a curved back, longitudinally-immovable curved jaws pivotally secured thereto, said jaws and back being concentrically curved and superimposed, and means for opening and closing said jaws.

JOSEPH O. DECKERT.

Witnesses:
JOHN A. WIEDERSHEIM,
WM. CANER WIEDERSHEIM.